(12) United States Patent
Boone

(10) Patent No.: US 10,597,996 B2
(45) Date of Patent: Mar. 24, 2020

(54) RIG FUEL MANAGEMENT SYSTEMS AND METHODS

(71) Applicant: Nabors Drilling Technologies USA, Inc., Houston, TX (US)

(72) Inventor: Scott G. Boone, Houston, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 126 days.

(21) Appl. No.: 15/794,640

(22) Filed: Oct. 26, 2017

(65) Prior Publication Data

US 2018/0066506 A1 Mar. 8, 2018

Related U.S. Application Data

(63) Continuation of application No. 13/700,353, filed as application No. PCT/US2010/036647 on May 28, 2010, now Pat. No. 9,803,461.

(51) Int. Cl.
   *H02J 1/10* (2006.01)
   *E21B 44/00* (2006.01)
   *H02J 3/38* (2006.01)

(52) U.S. Cl.
   CPC .............. *E21B 44/00* (2013.01); *H02J 3/38* (2013.01); *Y10T 307/50* (2015.04)

(58) Field of Classification Search
   CPC .... E21B 44/00; Y10T 307/50; Y10T 307/718; F02D 2200/0625; F02D 2200/06; H02J 3/46
   See application file for complete search history.

(56) References Cited

U.S. PATENT DOCUMENTS

| | | | |
|---|---|---|---|
| 3,400,615 A | 9/1968 | Godlove et al. | |
| 4,590,416 A * | 5/1986 | Porche | H02J 3/1885 174/DIG. 17 |
| 6,351,692 B1 * | 2/2002 | Eaton | G05B 19/042 322/10 |
| 6,761,193 B1 | 7/2004 | Cotton et al. | |
| 8,500,413 B2 * | 8/2013 | Stiles, Jr. | F04B 49/20 417/44.1 |
| 2003/0056824 A1 * | 3/2003 | Harvey | F02M 37/0047 137/265 |
| 2004/0055787 A1 * | 3/2004 | Zupanick | E21B 7/046 175/65 |

(Continued)

FOREIGN PATENT DOCUMENTS

CA 2733683 2/2010

OTHER PUBLICATIONS

International Searching Authority/United States Patent Office, "International Search," for PCT/US2010/036647, dated Jul. 26, 2010, 3 pages.

*Primary Examiner* — Rexford N Barnie
*Assistant Examiner* — Rasem Mourad
(74) *Attorney, Agent, or Firm* — Haynes and Boone, LLP

(57) ABSTRACT

Systems and methods for managing fuel and electrical power on a drilling rig, modifying the number of gensets in use before a change in power consumption is needed, and determining fuel savings are provided. The management includes determining an amount of emission reductions based on the fuel savings, and the emission reduction is based on reduction of carbon dioxide emissions, the fuel savings, or both.

23 Claims, 6 Drawing Sheets

(56) References Cited

U.S. PATENT DOCUMENTS

| | | | |
|---|---|---|---|
| 2004/0199297 A1* | 10/2004 | Schaper | H02J 3/00 |
| | | | 700/287 |
| 2007/0079804 A1* | 4/2007 | Nakayama | B60R 25/1004 |
| | | | 123/339.15 |
| 2007/0254196 A1* | 11/2007 | Richards | F01D 15/10 |
| | | | 60/39.281 |
| 2008/0156531 A1* | 7/2008 | Boone | E21B 7/06 |
| | | | 175/27 |
| 2009/0174538 A1* | 7/2009 | Shibata | B60K 6/48 |
| | | | 340/438 |
| 2009/0228155 A1* | 9/2009 | Slifkin | G06Q 10/08 |
| | | | 700/299 |
| 2009/0301723 A1* | 12/2009 | Gray | E21B 23/00 |
| | | | 166/301 |
| 2009/0312885 A1* | 12/2009 | Buiel | H02J 3/32 |
| | | | 700/297 |
| 2010/0102637 A1* | 4/2010 | Dozier | H02J 3/46 |
| | | | 307/84 |
| 2013/0234515 A1 | 9/2013 | Boone | |

* cited by examiner

FIG. 6

RIG FUEL MANAGEMENT SYSTEMS AND METHODS

This application is a continuation application of U.S. patent application Ser. No. 13/700,353, filed May 24, 2013, soon to issue as U.S. Pat. No. 9,803,461, which application is a U.S. national phase application of, and claims priority to, international application number PCT/US2010/036647, filed May 28, 2010, each of which is incorporated herein in its entirety by express reference thereto.

BACKGROUND OF THE INVENTION

Technical Field

The present invention is directed to systems and methods of determining fuel savings on a drilling rig efficiently during all phases of operation. The systems and methods also includes determining an amount of emission reductions based on the fuel savings, where the emission reduction is based on reduction of carbon dioxide emissions, the fuel savings, or both.

Background

A drilling rig is generally known as machine or system of machines that are configured to create wells, holes, bores, or shafts in the ground. Drilling rigs may be positioned on land or water, and may be stationary or movable. Regardless of the rig position or type, rigs used for petroleum extraction are often massive structures containing powerful machines, motors, and mechanical equipment that are used to support a drilling operation. Examples of machines and other motor driven equipment generally found on a petroleum extraction drilling rig include mud pumps, hoists, rotary tables, draw works, air compressors, hydraulic pumps, and top drives, along with various other machines, motors, and electrical devices.

Given the massive size of today's petroleum extraction rigs, combined with the significant depth to which many rigs are often configured to drill in order to reach viable petroleum deposits, the machines and mechanical equipment on a rig are inherently large and powerful. The size and power of the machines and mechanical equipment on the rigs necessitates that a substantial amount of electrical power is required to support a drilling operation. Further, a typical drilling operation includes several phases, where some phases may require significant amounts of electrical power and others may require much less electrical power. These varying power requirements are further complicated by the fact that drilling rigs are often positioned in remote locations where access to conventional power grids is either not available or presents significant challenges. As such, drilling rigs often use a bank of generators positioned on or proximate the drilling rig to supply power to the various machines and mechanical devices on the rig.

However, the conventional bank of generators used to supply power to drilling rigs present several challenges. For example, during phases of a drilling operation where minimal electrical power is required, each generator in the bank of generators continues to run, and as such, continues to consume fuel even though the power generated therefrom is not needed during the lower power consumption drilling phase. Similarly, unnecessarily running generators during non-peak power consumption phases of the drilling operation increases emissions and causes unnecessary wear on the engines and generators. Further, although some rig crews may attempt to manually shut down unnecessary generators during non-peak power consumption phases of a drilling operation, manually shutting down generators also presents challenges, as the generators must be restarted prior to a peak power consumption period. The engine powered generators on rigs require some time to warm to optimal operating temperature and are also frequently hard to start in cold temperatures. If the generators are not restarted in time to meet the need for power, then the drill pipe can be stuck in the hole, or worse case the safety of the crew can be compromised.

Accordingly, a need exists for systems and methods that can effectively manage energy and power use without the drawbacks described above.

SUMMARY OF THE INVENTION

The present invention relates to a system for managing power provided to a petroleum drilling rig. The system includes a power source in electrical communication with the drilling rig, and an engine management module operatively associated with the power source, and configured to monitor power consumption of the drilling rig and recommend methods to manage energy provided thereto.

An exemplary power source includes a plurality of engine-generator combinations (gensets), which in an embodiment includes at least one engine operably associated with at least one a plurality of engine-generators to form a genset. In one embodiment, the engine management module is configured to monitor loads on engines. In another embodiment, the engine management module is configured to determine fuel consumption rate, total fuel consumed by a genset, or both.

Preferably, the engine management module is configured to determine how many gensets are needed to provide power to operate the drilling rig, and to recommend adding a genset if power requirements are not being met or to recommend removing a genset from the power source if power requirements are sufficient.

In another embodiment, each of the plurality of gensets includes a source of rotational power, an electrical generator to receive rotational power from the source of rotational power; and a controller in communication with the source of rotational power, the electrical generator, and the energy management module. The controller is configured to receive control signals from the engine management module and control operation of the source of rotational power and the electrical generator in accordance with the control signals.

Each of the plurality of gensets may further include an interlock mechanism in communication with the controller and power source, and a fuel control valve in communication with the controller. The controller is configured to selectively shut down the source of rotational power if the interlock indicates that a fault is present.

Generally, the system also includes a remote management module operatively associated with the engine management module that is configured to transmit monitoring information to remote terminals and receive control information from remotely positioned control terminals. The monitoring and control information is typically transmitted via a computer network. The computer network may include, for example, an Internet based network, a satellite communication based network, a cellular communication network, or a land based computer network.

The present invention also relates to an electronic method for managing power use on a petroleum drilling rig. The method includes determining power requirements for specific activities on the drilling rig, monitoring power consumption on the drilling rig, and recommending methods to manage power use.

Examples of the specific activities include one or more of operating a pump at different rates, operating a pump with different hole sizes, raising a pipe out of a hole at different rates, or raising a pipe out of a hole with specific loads. In one embodiment, the monitoring includes comparing present energy consumption with that provided in a drilling program to plan future energy needs and manage energy use. The recommending preferably includes instructions to at least add or remove a genset from the power source in view of upcoming power needs.

In another embodiment, the monitoring includes operating an engine management module or computer program that is configured to determine how much power must be supplied to operate the drilling rig. In yet another embodiment, the monitoring includes determining a present power consumption and comparing the present power consumption to a predetermined percentage of total power provided. In this embodiment, an engine management module generally at least adds a genset if the power consumption is above the predetermined percentage, and generally at least removes a genset from the power source if the power consumption is below the predetermined percentage.

In a preferred embodiment, the recommending includes instructions to reduce or increase a speed of lifting a pipe, to reduce or increase a pump rate, to change the number of gensets, or a combination thereof. The instructions to change the number of engines preferably include instructions to add at least a genset if monitoring determines that energy needs are greater than that being supplied, and to remove a genset from the power source if monitoring determines that energy needs are less than that being supplied.

The method may further include continuing to monitor and recommend until a drilling process is complete. Preferably, the method also includes monitoring fuel consumption rate, total fuel consumed by an engine, or both.

The present invention further relates to an electronic power management system designed and configured to perform the present method.

In addition, the present invention relates to a method for managing energy use of gensets for a drilling rig. The method includes starting an initial bank of gensets to supply power to the drilling rig to begin a drilling process, monitoring upcoming power consumption needs for the drilling process, determining a required number of gensets to supply power needs, and continuing to monitor and determine until a drilling process is complete.

In one embodiment, the determining comprises includes adding an additional online engine and generator to the initial power bank if monitoring determines that the power consumption for an upcoming drilling phase is greater than the power supplied by the initial bank of gensets, or taking an genset offline from the initial power bank if monitoring determines that the power consumption for an upcoming drilling process is less than the power that is provided by the initial bank of gensets. In another embodiment, the method also includes adding an additional online genset to the initial power bank if a genset in the initial power bank has an unexpected reduction in power output, such as going offline unexpectedly.

The invention also encompasses systems and methods for managing fuel at a rig site. The system includes at least one sensor operatively associated with each energy-using component at the rig site, a fuel measuring mechanism to determine the amount of fuel available in one or more fuel tanks on site, and a fuel management module that is operatively associated with each fuel-using component (e.g., diesel fuel) and the fuel measuring mechanism that is configured to monitor fuel usage compared to remaining fuel to determine if any unexpected fuel loss has occurred. In one embodiment, the fuel-using components include a plurality of gensets, a mud fluid circulation device, or a combination thereof. In another embodiment, the fuel measuring mechanism includes at least one of a sensor present in each fuel tank, a fuel-measuring stick, gradations present on each fuel tank to permit visual inspection of fuel level, or a combination thereof. In a preferred embodiment, the fuel management module detects theft of fuel at the rig site, leaking from a portion of the rig, an inefficient fuel-using component, or a combination thereof.

BRIEF DESCRIPTION OF THE DRAWINGS

The purpose and advantages of the present invention will be set forth in and apparent from the description that follows, as well as by practice of the invention. Additional advantages of the invention will be realized and attained by the methods and systems particularly pointed out in the written description and claims hereof, as well as from the drawings as described below.

FIG. 6 is a sample screen layout for the rig crew to monitor the engine loads and to operate the rig efficiently according to the present disclosure.

DETAILED DESCRIPTION OF THE PREFERRED EMBODIMENTS

Figure 1:
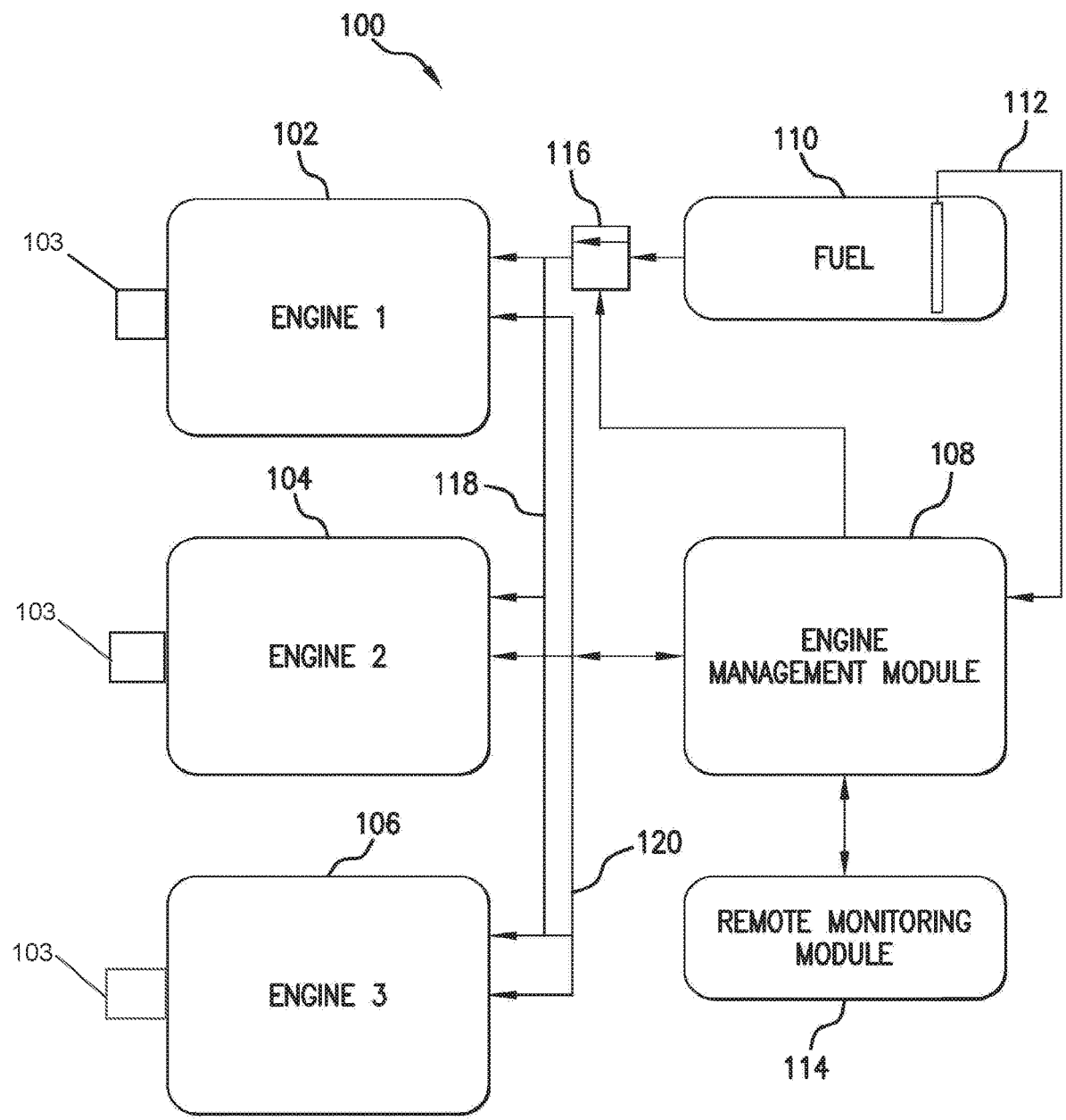
FIG. 1 is a block diagram of an exemplary engine management system according to one or more aspects of the present disclosure.

The present invention generally provides systems and methods for efficiently managing the electrical power supplied to a drilling rig during all phases of a drilling operation. In various embodiments, the benefits of the present invention can include better management of fuel consumption, reduced fuel consumption, reduced engine emissions, reduced engine hours, and reduced overall engine maintenance costs. By using the present systems and methods, rig sites can save substantial amounts of fuel each day, reduce emissions by about 10% to 60%, or in another embodiment about 15% to 40%, compared to conventional rig engine operation, and reduce engine hours by as much as about 10 to 600 hours, preferably about 100 hours to 500 hours, over a one-month period.

Prior to addressing the exemplary embodiments described herein, Applicant notes that the following description references exemplary embodiments. The present disclosure, however, is not limited to any specifically describe exemplary embodiment. Rather, any combination of the following features and elements, whether related to a described embodiment or not, may be used to implement and/or practice aspects of the present disclosure. Moreover, various exemplary embodiments may provide advantages over the prior art; however, although various exemplary embodiments may achieve advantages over other possible solutions and the prior art, whether a particular advantage is achieved by a given exemplary embodiment is not intended in any way to limit the scope of the present disclosure. Thus, the following aspects, features, exemplary embodiments, and advantages are intended to be merely illustrative and are not considered elements or limitations of the appended claims; except where explicitly recited in a claim. Similarly, references to "the invention" herein should neither be construed as a generalization of any inventive subject matter disclosed herein nor considered an element or limitation of the appended claims; except where explicitly recited in a claim.

The present systems and methods advantageously manage power use so that engines and fuel are used more efficiently than conventional rig power supply arrangements, and that rig operations run more smoothly than conventionally. As part of the methods, a rig crew can first perform tests that determine the power requirements for specific activities on the rig or that type of rig, or rely on a database of information regarding energy usage of various drilling rigsite activities. For example, the crew can determine the power required to operate each pump at a specific rate with specific hole sizes, pressures, and/or mud weights. They can also monitor the energy requirements of hoisting a pipe out of a hole at specific rates, with specific loads, and similar activities. The crew, with recommendations from the system according to the invention, is able to facilitate management of realtime activities with knowledge of the power required to perform the activities. For example, if the energy required to lift the pipe at a certain rate is greater than the amount available, the system will advise the crew to lift the block at a more appropriate speed. The energy management system will then use this information and compare it to the well's drilling program to plan future power needs and recommend methods to manage energy more efficiently on the rig. The collected information can also be used to build, or modify, a database that includes rigsite energy usage information. This comparison builds operations guidelines to help operate the rig more effectively, and also helps the rig crew manage the number of engines (and generators) that are online at any specific time during the drilling operations. The present invention can effectively manage the risk of engine overload by monitoring actual engine load, such as in real-time or preferably at a lag of no more than about 2 minutes or even about 0.5 seconds to 60 seconds, compared to real-time. Each current engine load is available, total engine load is available, and the status of idle engines is available. Engine load information can then be correlated with operating requirements. All of these methods can be used to build an optimal plan to reduce the amount of fuel consumed, and thus, reduce the emissions from the rig engines according to the invention. In one exemplary embodiment, the system or method for managing the electrical power supplied to a drilling rig may include computer software that advises the rig operators on the amount of engines required to manage the immediate and future power requirements.

The system can show the rig operator the current load of each engine and will recommend actions based upon expected future needs. For example, consider three engines at 30% loading that are running, while the rig is drilling at 30 ft/hr. The next connection is 90 feet away so the system can advantageously advise the rig crew to shut down two engines until the additional energy is needed. For example, the two engines can be shut down for 2 hrs and 30 minutes and then started when sufficient time remains to start one or more additional engines before the load is needed, preferably sufficient time for the engines to sufficiently warm up for optimum efficiency. Alternatively, by way of example, if only 30 minutes were left until the energy need is expected to spike, the system can recommend using that excess capacity to take care of a different task early or to store energy by lifting ballast. In the latter situation, the stored energy could later be released by lowering the ballast. Any suitable energy storage system can be used, e.g., using energy to chemically split two chemical elements, which can release energy when recombined.

The system preferably tracks the energy required from each rigsite activity and manages engines according to the needs at the rigsite for planned activities. The system learns the load to run one, two, or three pumps versus the rate versus mudweight, etc. If more power is required, the system may advise crew to reduce pump rate or slow hoisting activities to perform the next task without starting the engines, or without starting as many engines, as would otherwise be required. Similarly, the system can be configured to turn off one or more engines and advise the reduce the rate of energy usage on the rig if less energy is required due to lower future anticipated energy needs. On the contrary, the system can also recommend increasing the work rate, such as pumping or hoisting, to make better use of existing energy demands if more energy is expected to be need in short order so that turning off and later restarting an engine is not economical. This can advantageously make better use of the energy available at that time without having to cycle an engine off and on again too rapidly.

Further, at least one exemplary embodiment may be implemented as a program product for use with a computer system or processor. The program product may define functions of the exemplary embodiments (which may include methods) described herein and can be contained on a variety of computer readable media. Illustrative computer readable media include, without limitation, (i) information permanently stored on non-writable storage media (e.g., read-only memory devices within a computer such as CD-ROM disks readable by a CD-ROM drive); (ii) alterable information stored on writable storage media (e.g., computer disks for use with a disk drive or hard-disk drive, writable CD-ROM disks and DVD disks, zip disks, portable memory devices, and any other device configured to store digital data); and (iii) information conveyed across communications media, (e.g., a computer, telephone, wired network, or wireless network). These embodiments may include information shared over the Internet or other computer networks. Such computer readable media, when carrying computer-readable instructions that perform methods of the present disclosure, may represent embodiments of the present disclosure.

Further still, in general, software routines, modules, or operational blocks that are used to implement embodiments of the present disclosure may be part of an operating system or part of a specific application, component, program, module, object, or sequence of instructions, such as an executable script. Such software routines typically include a plurality of instructions capable of being performed using a computer system or other type or processor configured to execute instructions from a computer readable medium. Also, programs typically include or interface with variables, data structures, etc. that reside in a memory or on storage devices as part of their operation. In addition, various programs described herein may be identified based upon the application for which they are implemented. Those of ordinary skill in the art will readily recognize, however, that any particular nomenclature or specific application that follows facilitates description and does not limit embodiments of the present disclosure for use solely with a specific application or nomenclature. Furthermore, the functionality of programs described herein may use a combination of discrete modules or components interacting with one another. Those of ordinary skill in the art will recognize, however, that different embodiments may combine or merge such components and modules in a variety of ways.

FIG. 1 is a block diagram of an exemplary engine management system 100 according to one or more aspects of the present disclosure. The exemplary engine management system 100 generally includes a plurality of engines and generators 102, 104, 106 that may be configured to provide power to a rig while in operation. Each of the engines 102, 104, 106 may generally be in communication with a fuel source 110 via a fuel supply line and may also include a fuel return line 118. The fuel source 110 may be any sort of suitable fuel source 110, such as gasoline, diesel fuel, LP gas, or other fuel sources generally configured to run engine powered generators or engine-generator combinations (gensets). The fuel line 118 may further include a fuel flow metering device 116 that may be positioned between the fuel source 110 and each of the engines 102, 104, 106. As such, a plurality of fuel flow metering devices 116 may be used to individually monitor and collectively track the fuel delivered to each of the respective engines and the amount returned to the fuel tank from each of the engines. Further, the fuel metering devices 116 will generally be in communication with the engine management module 108. In one preferred embodiment, the fuel usage in every system of the rig will be tracked, e.g., mud fluid operations (such as oil-based compositions), or any other expected fuel usage on the rig or rigsite. This tracked fuel usage can then be matched against the actual amount of fuel (as measured or estimated) in the fuel tank(s) on site.

The engine management module 108 is generally configured to control the operation of each of the components in the engine management system 100. As such, the engine management module 108 is generally in communication with each of the engines 102, 104, 106 via a communication line 120. The engine management module 108 is configured to send control signals to each of the engines 102, 104, 106 via communication line 120, wherein the control signals are configured to control the operational characteristics of each of the respective engines. Similarly, the engine management module 108 is also configured to receive inputs from each of the respective engines via the communication line 120. These inputs, which are generally sensors 103 at each of the respective engines, may be used to determine the subsequent control signals sent from the engine management module 108 to the respective engines, i.e., sensors 103 and their respective engines may be used to communicate safety, fault, or performance information back to the engine management module 108 such that the respective engines may be shut down or restarted in the event the system either determines they are not needed or in the event they are needed to provide power to a future activity. The module may also communicate with the engines to shut them down in the event of a fault, failure, or other condition affecting safety or performance. Further, the engine management module 108 may receive data from the engine that indicates the load being applied to the engine by the generator. It may also receive fuel consumption rate and the total fuel consumed by each engine. This information can be used by the engine management system to optimize the operation of these engines to conserve fuel. The information can also be used to detect operational or service issues with each engine and help the rig crew better maintain the engines. Further, the engine management module 108 may be in communication with the fuel source 110 and include a fuel level indicator 112 configured to determine the quantity of fuel remaining in the fuel source 110. As such, the engine management module 108 has the ability to accurately monitor the fuel being used by the engine powered generators and detect possible leaks in the system, detect inefficient equipment that has broken or aged sufficiently that repair or replacement is required, or detect theft of fuel on the rigsite. This information can be obtained by comparing the monitored fuel usage in each of the rig systems and compared against the fuel remaining in the fuel tank(s), and may also be used to plan future deliveries of fuel.

The exemplary engine management system 100 also includes a remote monitoring module 114. The remote monitoring module 114 is generally configured to transmit or communicate information from the engine management system 102 to at least one remotely positioned monitoring or system control terminal. The remotely positioned terminal may be positioned at the rig or at a location geographically remote to the rig, as will be further described herein. The remote monitoring module 114 may generally be in communication with the engine management module 108, and is generally configured to receive inputs therefrom that are to be transmitted to the various remote terminals. In alternative embodiments, the remote monitoring module 114 may be in direct communication with each of the respective engines. Additionally, the remote monitoring module 114 may also be configured to transmit control signals from the remote terminal to the engine management module 108. In this configuration, the information control signals transmitted from the remote terminal to the engine management module 108 may be used to remotely control operations at the rig via the control signals generated in the engine management module 108 (and transmitted to the respective engines) in response to the control signals transmitted from the remote terminal.

Figure 2:
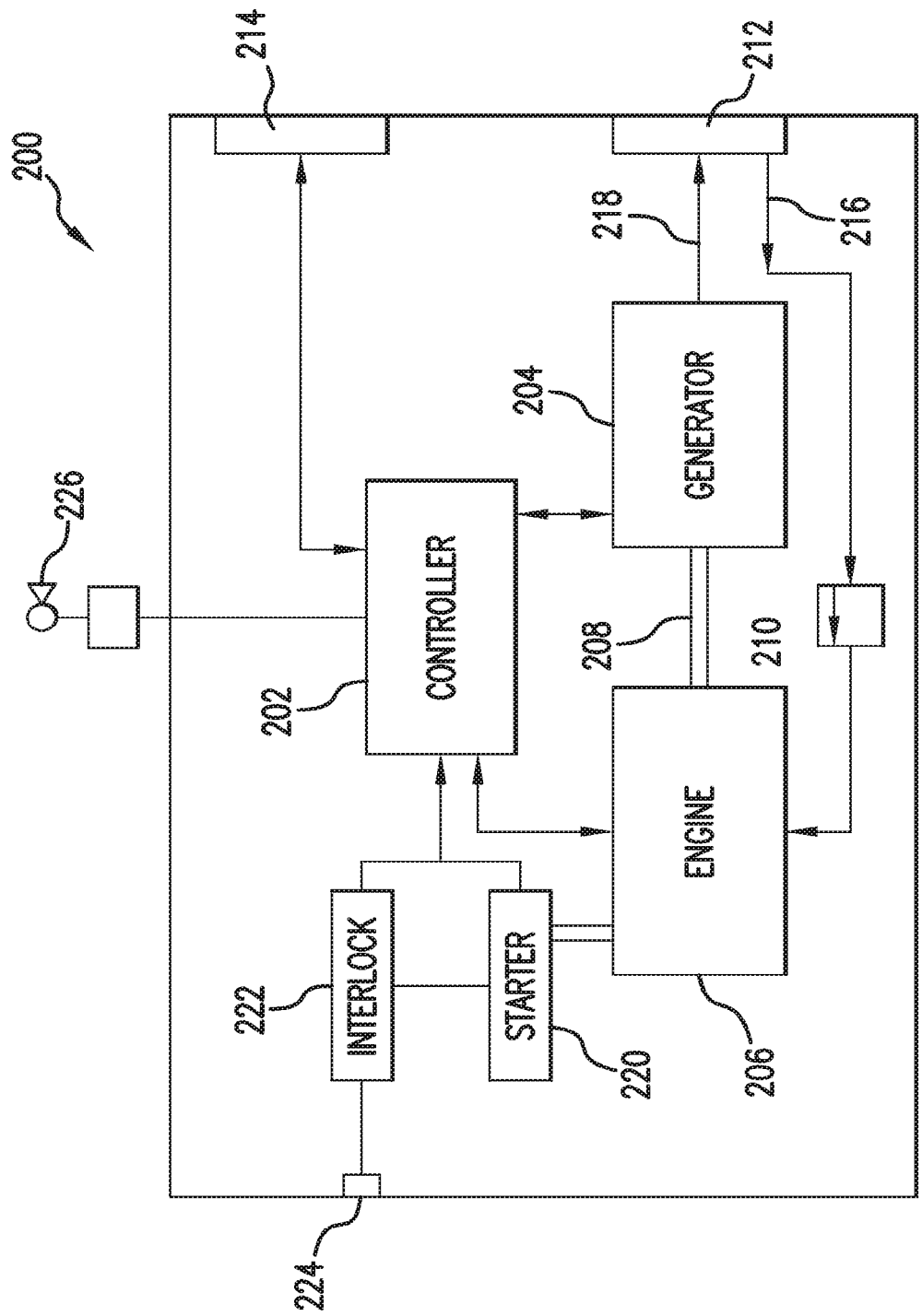
FIG. 2 is a block diagram of an exemplary generator according to one or more aspects of the present disclosure.

FIG. 2 is a block diagram of an exemplary power source 200 according to one or more aspects of the present disclosure. The exemplary power source 200 generally includes a controller 202, an engine 206 in communication with the controller 202, and a generator 204 in mechanical communication with the engine. The controller 202 is generally in communication with a control interface 214 that is configured to send and receive information between the power source 200 and external components, such as the engine management module 108 showing FIG. 1. Thus, the interface 214 allows the exemplary power source 200 to communicate with various other machines, devices, or control systems associated with the rig. In an exemplary embodiment, the engine 206 may be a gasoline, gas or diesel powered engine generally mechanically coupled to the generator 204 via a coupling 208, which may be a shaft that is configured to transfer the rotational power generated by the engine 206 to the generator 204. The generator 204 converts the rotational power into electrical power and transmits the electrical power therefrom via electrical transmission line 218, which is in communication with an operational interface 212. The operational interface 212 generally operates to communicate non-control information, such as the electrical power generated by the power source 200 or the fuel provided to the engine 206 by the fuel line 216, to and from the exemplary power source 200.

The controller 202 is generally in communication with each of the components within the exemplary power source 200. For example, the controller 202 may be in communication with a starter 220 that is configured to selectively initiate operation of the engine 206. The controller 202 may also be in direct communication with the engine 206, such that the controller may adjust operational parameters, such as the RPM, of the engine 206. Similarly, the controller 202 may also be in communication with the generator 204 to control operational parameters thereof. The controller 202 may further be in communication with an interlock module 222 that is configured to prevent unsafe starting or operation of the exemplary power source 200. The interlock 222 will generally be in communication with both the starter 220 and an external interface 224 that allows a user to activate a button or switch on the interface 224 to prevent the exemplary power source 200 from starting or stopping the operation of the exemplary power source 200 during an unsafe condition. Further, as an additional safety or control feature, the controller 202 may also be in communication with a fuel control valve 210 positioned between the operational interface 212 and the engine 206. As such, the controller 202 may selectively start or stop the fuel flow to the engine 206 to control the operation thereof, thus providing another safety shut off mechanism for the power source 200. The controller 202 may also be in communication with an external warning device 226, which may include a visual warning device, such as warning lights, and/or audible warning devices, such as a siren or warning horn that may be activated by the controller 202 to warn workers near the power source 200 when it is about to start to prevent safety hazards to workers.

Figure 3:
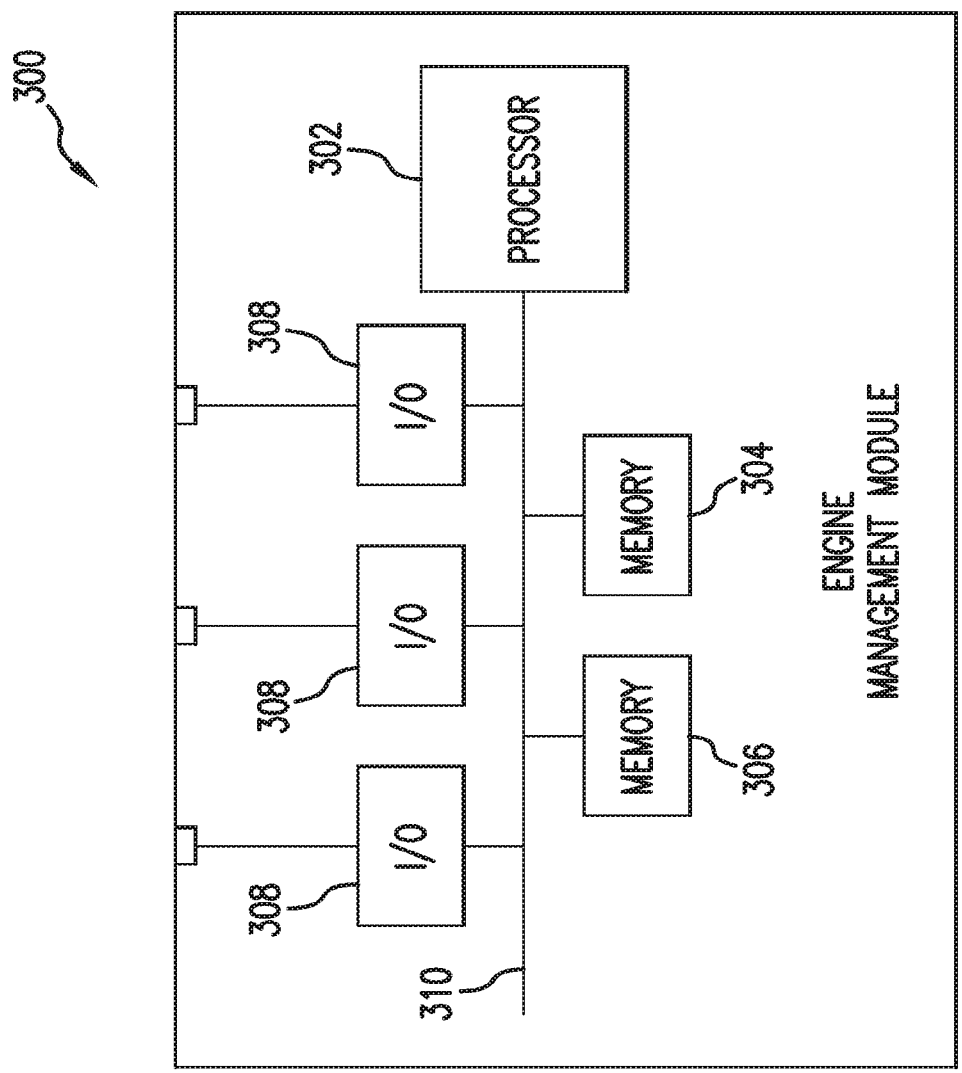
FIG. 3 is a block diagram of an exemplary engine management module according to one or more aspects of the present disclosure.

FIG. 3 is a block diagram of an exemplary engine management module 300 according to one or more aspects of the present disclosure. The engine management module 300 generally includes a processor 302, which may be any type of processor configured to execute instructions, logical sequences, or computer programs. One example of a processor is a computer processor, such as those manufactured by Intel® and AMD®. The processor 302 may generally be in communication with a system bus 310 that is configured to allow the processor 302 to communicate with various other components of the exemplary engine management module 300. The bus 310 may be in communication with a first memory 304 that is configured to store operational programs or instructions thereon that are configured to control the operation of the engine management module 300. The bus 310 may also be in communication with a second memory 306 that is configured to store operational data. As such, generally the controlling program for the engine management module 300 will be stored in a first memory 304, and data related to or acquired by the controlling program may be stored in a separate memory 306. In at least one embodiment, the two memory elements may be combined into a single memory element without changing the functionality of the module. The system bus 310 may also be in communication with a plurality of input/output-type communication modules 308. These modules may generally be configured to receive data or instructions from external components, devices, machines, etc. and to communicate this information via the system bus 310 to the processor 302. Similarly, instructions generated by the engine management module 300 may be communicated via the system bus 310 and at least one of the input output/modules 308 to and external component, device, or machine.

Thus, the engine management module 300 is generally configured to operate as a stand-alone controller. The control operation of the engine management module 300 is generally governed by a pre-defined algorithm or sequence of logical operations that may be stored as a computer program in one of the memory elements and run or executed by the processor. The engine management module may receive inputs from external sources, such as sensors or instructions from other controllers, and process the inputs to generate corresponding control instructions to be transmitted to other components in the system, wherein the control instructions are generated in accordance with the computer program stored on the memory element.

Figure 4:
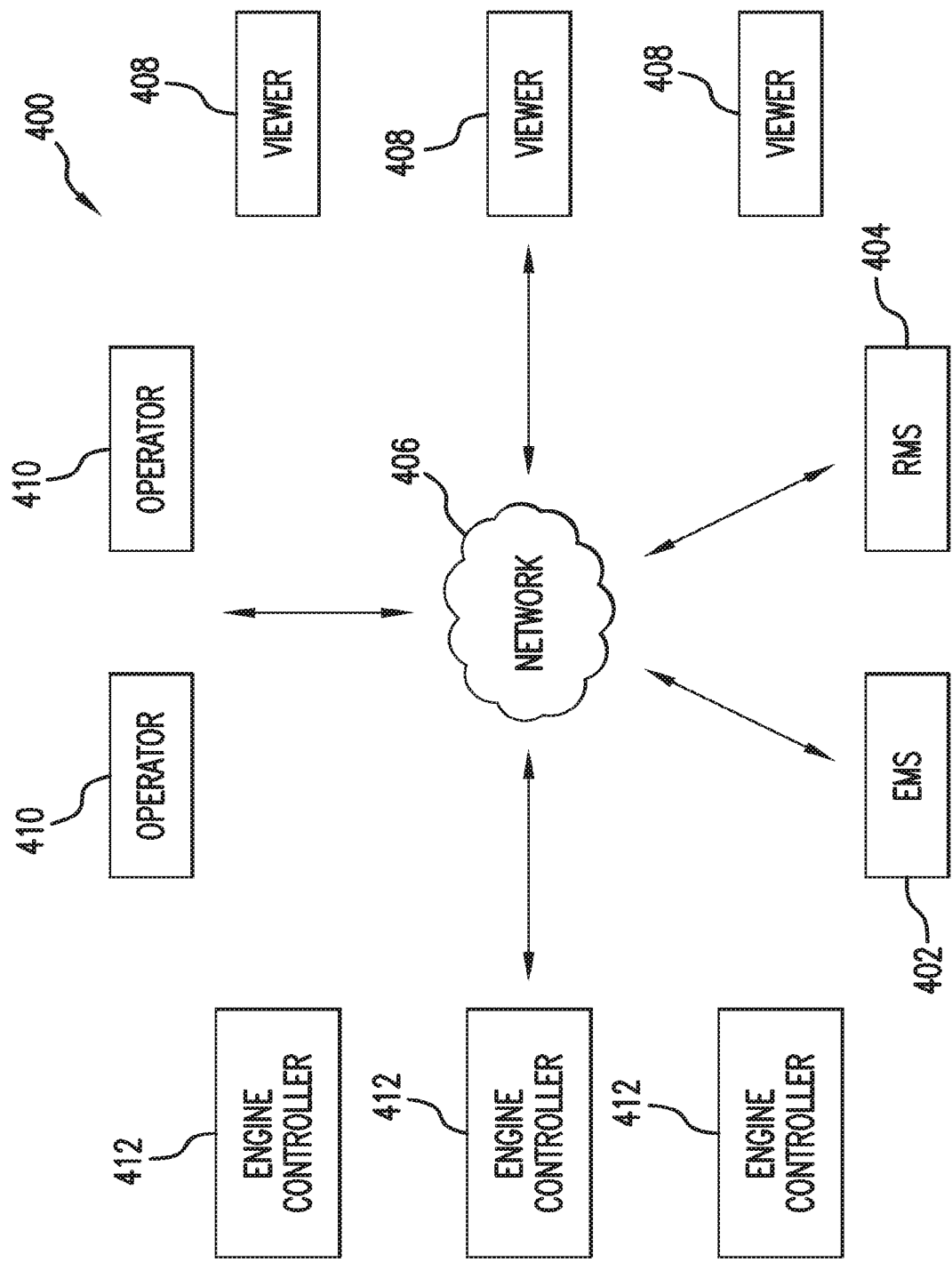
FIG. 4 is a block diagram of an exemplary remote monitoring module and an associated network according to one or more aspects of the present disclosure.

FIG. 4 is a block diagram of an exemplary remote monitoring module and associated network 400 according to one or more aspects of the present disclosure. The remote monitoring module 400 generally receives information from the engine management module 108, as shown in FIG. 1. The primary function of the remote monitoring module 400 is to allow for remote monitoring and/or control of the engine management module 108. Thus, the remote monitoring module 400 generally operates to communicate operational parameters from the engine management module 108 to a plurality of remote users.

Similarly, the remote monitoring module 400 also operates to receive control instructions from remote users and communicate those control instructions to the engine management module 108 for implementation. In at least one embodiment, the engine management system 402 and the remote monitoring system 404 may be in communication with a communication network 406. The communication network 406 may be any type of communication network, such as a WAN, LAN, an Internet-based network, private network, a satellite-based communication network, an optical or fiber based network, a radio frequency wireless communication network, or any other type of network generally used to communicate data between two remote or local locations.

As illustrated in FIG. 4, the network 406 may be accessible by a plurality of remote viewers 408. These remote viewers 408 may include workstations configured to interface with the engine management system 402 via the network 406 to view the operational parameters or characteristics of the rig, or more particularly, the operational characteristics of the engine management system. The network 406 may further be in communication with one or more operator stations 410. The operator stations 410 may be configured to not only view the operational characteristics of the rig and/or engine management system 402, but may also be configured to provide controlling instructions that are transmitted back to the rig and/or engine management system 402 to adjust the operational characteristics or parameters thereof. Additionally, the network 406 may also be in communication with the individual engine controllers 412 positioned within each of the respective engines, as denoted by reference number 200 in FIG. 2.

Figure 5:
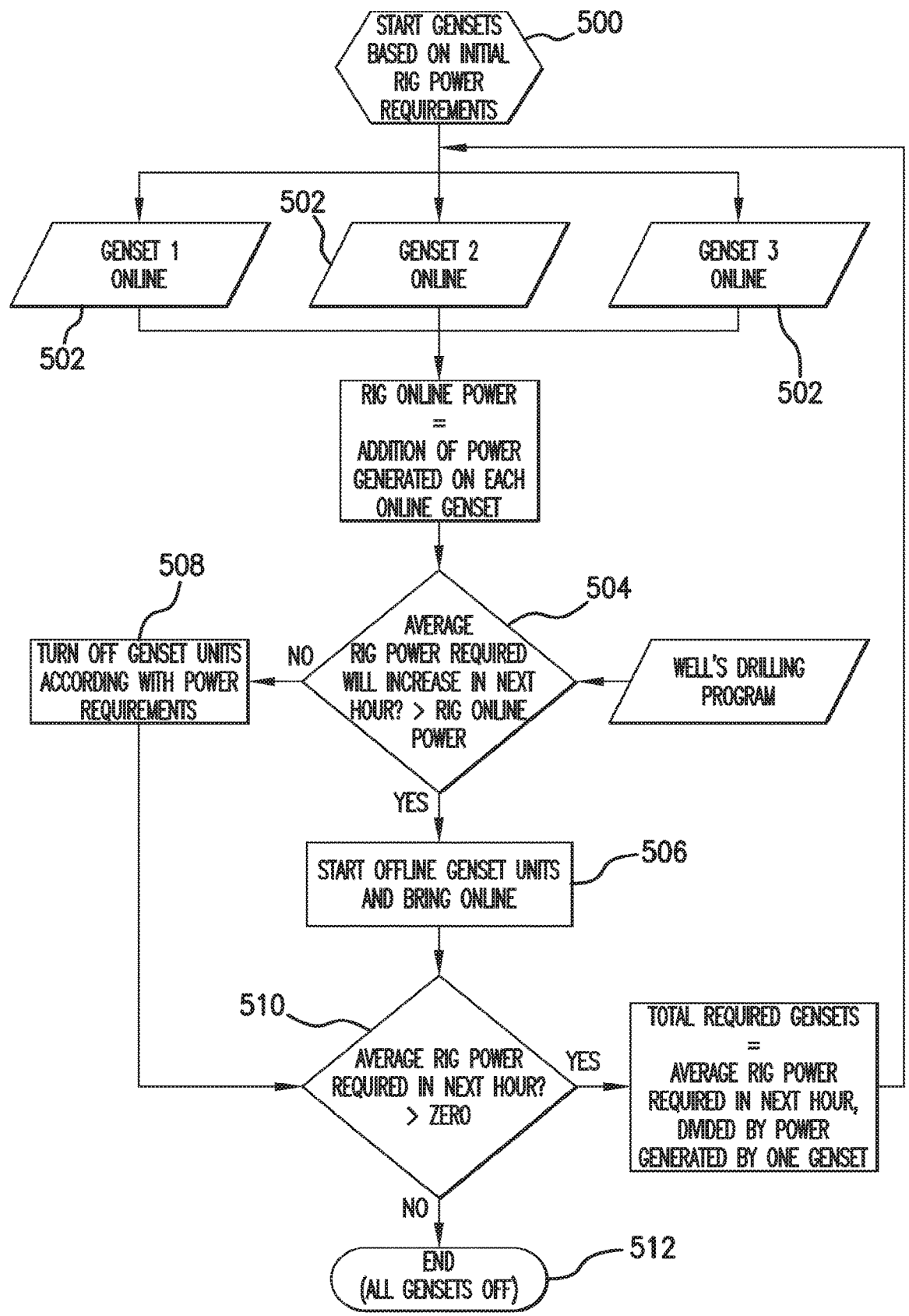
FIG. 5 is a flowchart of an exemplary method of engine management according to one or more aspects of the present disclosure.

FIG. 5 is a flowchart of an exemplary method of engine management according to one or more aspects of the present disclosure. The exemplary method begins at step 500 and continues to step 502, where a bank of power engine-generator combinations (gensets) on a drilling rig is started in preparation for supporting a drilling operation on the rig. This initial bank of power gensets may be generally calculated to provide sufficient power to at least initiate a drilling operation at the associated rig. Once the initial power bank has been started, the method may continue to step 504 where the upcoming power consumption needs of the rig for drilling operation are continually monitored. This monitoring step 504 may include monitoring the drilling program that operates the entire rig and controls the drilling operation in general to determine the upcoming power consumption needs for the drilling process. For example, if the drilling program indicates that a plurality of mud pump motors are going to be started in the next hour, and these mud motors will require a significant increase in power to be supplied to the rig, then the monitoring step 504 may be used to feedback the drilling control program and determine when these types of increased power consumption processes are going to be started. In this scenario, if additional power is going to be needed in an upcoming phase of a drilling operation, then additional gensets may be started in advance of the increased power requirement (as discussed below). Similarly, if the drilling control program indicates that pluralities of high electrical demand mud pump motors have just been shut off and that the future power consumption needs are not expected to increase, then the monitoring step 504 may be used to determine when the power consumption of the drilling process is going to substantially decrease. In response to an anticipated decrease in power consumption, gensets may be electrically taken off-line or shut down to save fuel and reduce engine emissions. In other aspects of the invention, the monitoring step 504 may be used to electrically bring additional gensets online when an online genset unexpectedly goes off line, such as when a mechanical failure occurs.

Regardless of whether the monitoring step 504 determines that the power consumption of the drilling process is expected to increase or decrease, once a power consumption change is determined in the monitoring step 504, the method continues to either step 506 or step 508. In instances where the monitoring step 504 determines that the anticipated power consumption for the drilling process will increase, then the method continues to step 506 where off-line gensets are electrically started and/or brought online. The number of gensets started at step 506 may generally be calculated by dividing the amount of power required for the upcoming drilling phase that has been determined to use more power by the power generated by each genset. This will determine the number of gensets that need to be online to meet the upcoming power consumption needs. Similarly, if the monitoring step 504 determines that the power consumption will decrease in short order, then the method may continue to step 508 where online gensets are electrically shut down to decrease the amount of power provided to the drilling operation. In similar fashion to determining the number of gensets needed in the situation of a power consumption increase, the method may calculate the number of gensets to be electrically shut down based upon the power to be supplied by each generator and the power consumption of the drilling process in the immediate future. Once the required number of gensets are either electrically brought online or taken off-line, the method continues to step 510, where monitoring of the upcoming power consumption needs of the drilling process is continued. Once the drilling process completes the need for power consumption, monitoring ends and the method continues to step 512.

The steps illustrated in FIG. 5 may generally be conducted by the engine management module 108 illustrated in FIG. 1. The engine management module 108 may generally be in communication with the rig control program, and as such, may be configured to monitor the power consumption needs of each phase of the drilling process. As such, the engine management module 108 may be used to strategically bring generators online when power consumption needs are anticipated to increase, and similarly, when power consumption needs are anticipated to decrease, the engine management module 108 may be used to strategically take generators off-line. All of this will follow good practices for starting and stopping engines and generators.

Figure 6:
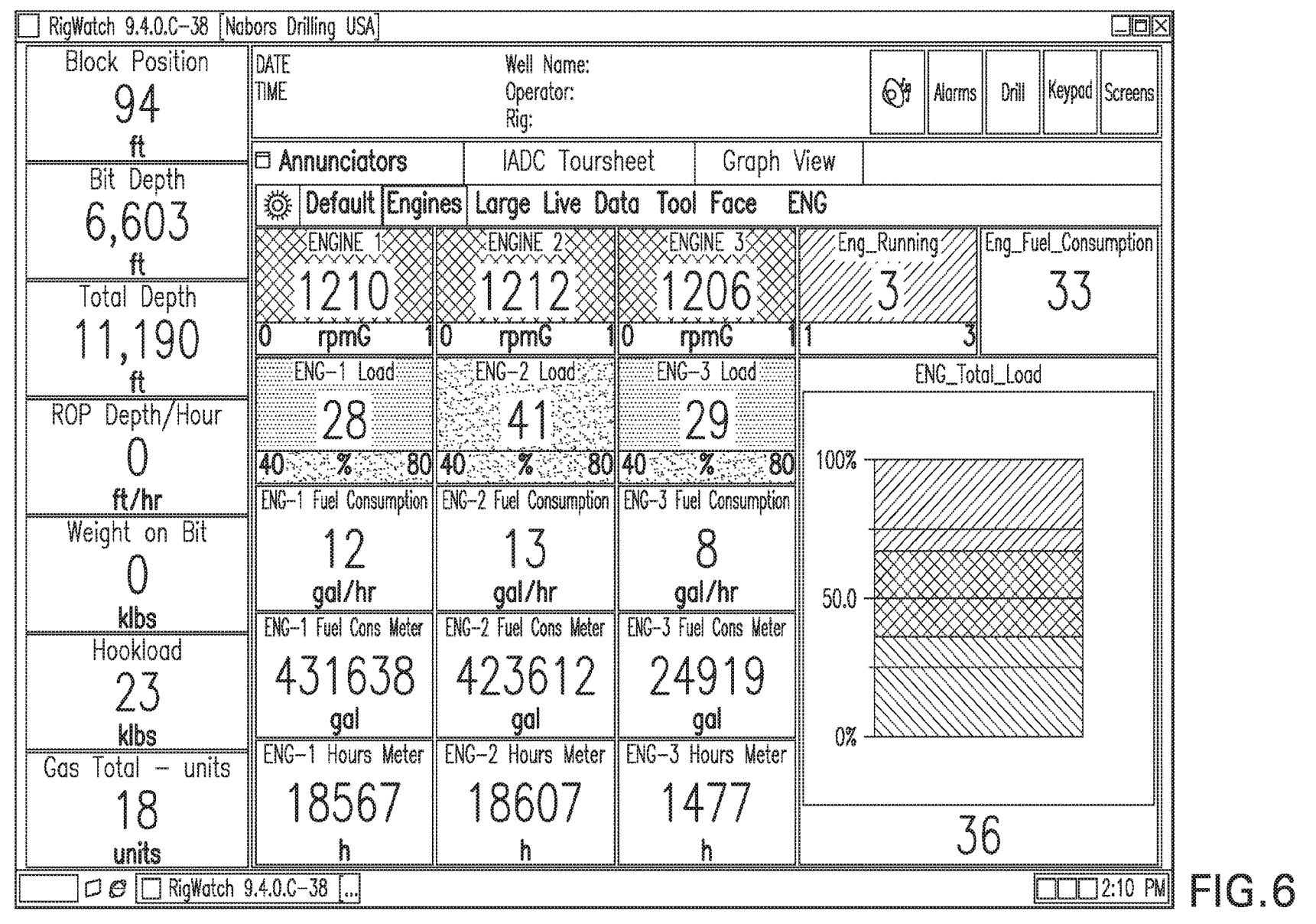

FIG. 6 shows a sample screen layout to monitor engine loads. The screen illustrates the load on each of three engines and the fuel consumption, as well as engine hours. The screen can advantageously facilitate more efficient operation of the rig. The information on the screen preferably optimizes the operation of the engines to conserve fuel, and helps the crew detect operational or service problems with the engines that need to be fixed to maintain readiness and efficient operation. Other information that may be monitored, managed, displayed, or a combination thereof, includes one or more of the following individual, multiple, or average values, or other calculated combinations of: battery voltage, engine speeds, engine oil temperatures, engine oil pressures, total fuel, engine load factors, fuel filter differential pressures, oil filter differential pressures, coolant levels, and oil levels.

The strategic power management of the bank of generators supplying power to the rig may allow for a substantial increase in the efficiency of the generator bank and/or a substantial decrease in the emissions and environmental pollutants expelled by conventional rig generator banks. For example, in a typical generator bank configuration each of the generators in the bank are run at normal speed for the entire drilling process, and as such, each generator burns a full fuel load regardless of the power consumption needs of the rig. Conversely, the system and method provided herein may optimize the power provided to the rig so that only the required numbers of gensets are running at all times. Further, the system and method provided herein may be forward-looking to anticipate the upcoming power consumption needs of the rig so that the appropriate number of gensets may be brought online to meet the power consumption need without delaying drilling operations to wait for a genset to come online.

Therefore, one or more aspects of the exemplary embodiments described herein may provide a system or method for controlling a bank of engine-generator combinations (gensets) supplying power to a drilling rig. One or more aspects of the exemplary embodiments may include a computer program configured to monitor a drilling control program, and to adjust the number of gensets supplying power to the drilling raid in accordance with the anticipated power consumption of the drilling process in upcoming drilling phases. One or more aspects of the exemplary embodiments may include a computer program or control module configured to increase the number of gensets supplying power to a drilling rig when power consumption increases above a predetermined threshold, and similarly, the computer program or control module may also be configured to decrease the number of gensets supplying power to the drilling rate when the power consumption falls below a predetermined threshold.

In another exemplary embodiment of the invention, the engine management module 108 may be configured to control the number of gensets used for a drilling process in accordance with a predetermined algorithm. For example, the engine management module 108 may be configured to monitor the total power consumption currently being used by a drilling process or the total of all loads on the engines. When the current total load exceeds a predetermined threshold, such as 80% for example, then the engine management module 108 may be configured to start and bring online an additional gensets that may be electrically added to the bank of gensets supplying power to the drilling process. Thus, the engine management module may continually provide sufficient power to the drilling process, while still minimizing the excess power generated, as only the number of gensets required plus one additional genset will be used at any given time. Similarly, the engine management module 108 may be configured to shut down or take off-line gensets when the total power consumption for a drilling process falls below a predetermined threshold. As such, when power consumption falls and a plurality of gensets are running without the power generated therefrom being used, then the engine management module 108 may operate in accordance with a predetermined algorithm to electrically shut down at least one genset to reduce the total power provided. However, the total power provided by the plurality of gensets after a generator is shut down will be calculated to be more power than is currently being used by the drilling process. Further, the total power provided may also be sufficiently greater than the current power consumption so as to not necessitate an additional genset immediately being started, thus avoiding an unnecessary control loop whereby gensets are started and stopped unnecessarily.

Without being bound by theory, it is believed that energy management according to the invention can permit collection and management of information concerning best practices for energy usage associated with a drilling rigsite. For example, energy use for lifting a weight or rotating a tubular is not a function of the weight of those objects, but rather a matter of the speed with which the action can take place. If an operation can be done more slowly, while at the same time management of other tasks ensures that the delay in completing this operation will not delay other rigsite activities, this advantageously permits use of a reduced number of engines, or engines operating at optimum instead of above-optimum loads, to conduct that operation more slowly according to the invention.

One exemplary embodiment of the disclosure may provide a system or method for managing the electrical power supplied to a drilling rig during all phases of a drilling operation. The system may include a plurality of gensets in electrical communication with the drilling rig, and an engine management module in communication with each of the plurality of gensets and configured to monitor a rig drilling program to determine when additional gensets should be brought online to meet upcoming power consumption needs or when additional gensets should be taken offline to reduce power provided in view of upcoming power needs.

Another exemplary embodiment of the disclosure may provide a method for controlling power gensets for a drilling rig. The method may include starting an initial bank of gensets to supply power to the drilling rig, beginning a drilling process, monitoring upcoming power consumption needs for the drilling process, electrically adding an additional online genset to the initial power bank if monitoring determines that the power consumption for an upcoming drilling phase is greater than the power supplied by the initial bank of generators, electrically taking a genset offline from the initial power bank if monitoring determines that the power consumption for an upcoming drilling process is less than the power that is provided by the initial bank of gensets with a genset taken offline from the initial bank, and continuing to monitor, add, and take gensets offline until a drilling process is complete.

Another exemplary embodiment of the disclosure may provide a method for controlling power gensets for a drilling rig. The system may include starting an initial bank of gensets to supply power to the drilling rig, continually monitoring upcoming power consumption needs for a drilling process until the drilling process is completed, electrically adding an additional online genset to the initial power bank if monitoring determines that the power consumption for an upcoming drilling phase is greater than the power supplied by the initial bank of gensets, and electrically taking a genset offline from the initial power bank if monitoring determines that the power consumption for an upcoming drilling process is less than the power that is provided by the initial bank of gensets with a genset taken offline from the initial bank.

EXAMPLES

The invention is further defined by reference to the following example, showing the comparison between two engine data test wells. These examples are for illustrative purposes only, and are not to be construed as limiting the appended claims.

Example 1: Engine Data Test Well Comparison

The engines in two test wells were compared. Test Well #1 used current engine practice for 43 days, and Test Well #2 used the present systems and methods for 37 days. Test Well #1 utilized $3,660/day of engine fuel, costing about $158,000 total. In contrast, Test Well #2 utilized $2,600/day of engine fuel, costing about $97,000 total. Below is a more detailed comparison of the two wells.

|  | Test Well # 1 | Test Well # 2 | Savings Typical Well |
|---|---|---|---|
| Days | 43 | 37 | 40 |
| Total Engine Fuel (gal) | 63,000 | 38,500 | (−) 21,380 |
| Total Engine Hours (hr) | 2,654 | 1,716 | (−) 662 |
| Average Fuel/day (gal) | 1,464 | 1,040 | (−) 424 |
| Average Total Engine Hours/day | 62 | 46 | (−) 16 |
| Average Total Eng Load/day (%) | 37 | 38 |  |
| Number of days running 1 Engine | 1 | 2 | (+) 1 |
| Number of days running 2 Engines | 17 | 33 | (+) 20 |
| Number of days running 3 Engines | 25 | 2 | (−) 23 |

As can be seen from the data above, significant savings were achieved in Test Well #2. The total fuel, engine hours, average fuel/day, and average total engine hours/day were substantially lower for Test Well #2.

Below is a table that provides a further breakdown of the savings and quantifies emission reductions.

|  | Per day | Per Well (40 Days) |
|---|---|---|
| Fuel Saved - (Gal) | 424 | 17,000 |
| Fuel Savings - (US $)[1] | $1,060 | $42,400 |
| Emissions Reduction - (metric Tons $CO_2$)[2,3] | 4.27 | 171 |
| Carbon Credit Value - (US $)[4] | $81 | $3,260 |
| Engine Hour Reduction - (Hours) | 16 | 640 |
| Engine Hour Savings - (US $)[5] | $80 | $3,200 |

[1] Assuming $2.50/gallon
[2] EPA420-F-05-001 February 2005
[3] One metric Ton of $CO_2$ equivalent = One Certify Emissions Reduction Credit (CER)
[4] One CER price equivalent = $19 (ECX - European Climate Exchange)
[5] Assuming $5/Hour Engine Maintenance, Repair and Operation (MRO) Costs The foregoing outlines features of various embodiments so that those of ordinary skill in the art may better understand the aspects of the present disclosure. Those of ordinary

The invention claimed is:

1. A system for managing power on a petroleum drilling rig, comprising: a power source in electrical communication with the drilling rig, wherein the power source comprises a plurality of engine-generator combinations (gensets); and an engine management module that is operatively associated with the power source and that is configured to: start an initial bank of gensets from the plurality of gensets; monitor power consumption associated with the drilling rig during one or more operations; modify the initial bank of gensets before a change in power requirements is needed, wherein the modification adds at least one genset to or removes at least one genset from the initial bank of gensets based on the change in power requirements; receive, for a modified initial bank of gensets, a total amount of fuel consumed; determine, for the initial bank of gensets, a total amount of fuel consumed; combine the received total amount of fuel consumed with the determined total amount of fuel consumed to provide tracked fuel usage; determine that inefficient equipment is a cause of an unexpected fuel loss; and determine that repairing or replacing the inefficient equipment is required; at least one sensor operatively associated with each fuel-using component at the rig site; and a fuel measuring mechanism to determine the amount of fuel available in one or more fuel tanks on site, wherein the fuel measuring mechanism is configured to compare the tracked fuel usage to the determined quantity of fuel remaining in the fuel tanks to determine if any unexpected fuel loss has occurred.

2. The system of claim 1, wherein the engine management module is further configured to determine a number of hours that a genset is online.

3. The system of claim 1, wherein the engine management module is further configured to monitor a power load on each genset.

4. The system of claim 1, wherein each of the plurality of gensets comprises:
   a source of rotational power;
   an electrical generator to receive rotational power from the source of rotational power; and
   a controller in communication with the source of rotational power, the electrical generator, and the energy management module, wherein the controller is configured to receive one or more control signals from the engine management module and control operation of the source of rotational power and the electrical generator in accordance with the one or more control signals.

5. The system of claim 4, wherein each of the plurality of gensets further comprises:
   an interlock mechanism in communication with the controller and rotational power source; and
   a fuel control valve in communication with the controller, wherein the controller is configured to selectively operate the fuel control valve to shut down the source of rotational power if the interlock indicates that a fault is present.

6. The system of claim 1, further comprising a remote management module operatively associated with the engine management module that is configured to transmit monitoring information to a remote terminal and to receive control information from a remotely positioned control terminal.

7. The system of claim 6, wherein the monitoring and control information is transmitted via a computer network.

8. The system of claim 7, wherein the computer network is at least one of an Internet based network, a satellite communication based network, a cellular communication network, or a land based computer network.

9. The system of claim 1, wherein the fuel-using components comprise the plurality of gensets, and a mud fluid circulation device.

10. The system of claim 1, wherein the fuel measuring mechanism comprises at least one of a sensor present in each fuel tank, a fuel-measuring stick, gradations present on each fuel tank to permit visual inspection of fuel level, or a combination thereof.

11. The system of claim 1, wherein the engine management module detects theft of fuel at the rig site, leaking from a portion of the rig, an inefficient fuel-using component, or a combination thereof.

12. An electronic method for managing power use on a petroleum drilling rig, which comprises: determining a power requirement for each of a plurality of specific activities on the drilling rig; monitoring power consumption on the drilling rig during one or more operations; comparing the determined power requirement and the power consumption; based on the comparison, modifying an initial bank of engine-generator combinations (gensets) before a change in power requirements is needed by adding at least one genset to or removing at least one genset from the initial bank of gensets; receiving, for a modified bank of gensets, a total amount of fuel consumed; determining, for the initial bank of gensets, a total amount of fuel consumed; combining the received total amount of fuel consumed with the determined total amount of fuel consumed to provide tracked fuel usage; determining a quantity of fuel remaining in a fuel source; comparing the tracked fuel usage to the determined quantity of fuel remaining in the fuel source; determining, based on the comparison, that an unexpected fuel loss has occurred; determining that inefficient equipment is a cause of the unexpected fuel loss; and determining that repairing or replacing the inefficient equipment is required.

13. The method of claim 12, wherein the plurality of specific activities comprises operating a pump at different rates, operating a pump with different hole sizes, raising a pipe out of a hole at different rates, or raising a pipe out of a hole with a specific load, or a combination thereof.

14. The method of claim 12, wherein the monitoring comprises comparing present energy consumption with that provided in a drilling program to plan future energy needs and manage energy use.

15. The method of claim 12, wherein the monitoring comprises operating an engine management module or computer program that is configured to determine a quantity of power to be supplied to operate the drilling rig.

16. The method of claim 12, wherein the monitoring comprises determining a present power consumption and comparing the present power consumption to a predetermined percentage of total power provided.

17. The method of claim 16, wherein an engine management module at least adds a genset when the power consumption is above the predetermined percentage, and at least removes a genset when the power consumption is below the predetermined percentage.

18. The method of claim 12, further comprising recommending methods to manage power use for at least one of the plurality of specific activities based on the comparison, wherein the recommending comprises instructions to reduce or increase a speed of lifting a pipe, to reduce or increase a pump rate, or a combination thereof.

19. The method of claim 12, further comprising continuing to monitor and recommend until a drilling process is complete.

20. An electronic power management system designed and configured to perform the method of claim 12.

21. A method for managing power use of a plurality of engine-generator combinations (gensets) for a drilling rig, comprising: starting an initial bank of gensets to supply power to the drilling rig to begin a drilling process; monitoring upcoming power consumption needs for the drilling process; determining a required number of gensets to supply the upcoming power consumption needs; in response to the determination, modifying the initial bank of gensets before a change in power consumption needs occurs by adding at least one genset to or removing at least one genset from the initial bank of gensets; receiving, for a modified initial bank of gensets, a total amount of fuel consumed; determining, for the initial bank of gensets, a total amount of fuel consumed; combining the received total amount of fuel consumed with the determined total amount of fuel consumed to provide tracked fuel usage; determining a quantity of fuel remaining in a fuel source; comparing the tracked fuel usage to the determined quantity of fuel remaining in the fuel source; determining, based on the comparison, that an unexpected fuel loss has occurred; determining that inefficient equipment is a cause of the unexpected fuel loss; determining that repairing or replacing the inefficient equipment is required; and continuing to monitor and determine the required number of gensets until the drilling operation is complete.

22. The method of claim 21, further comprising determining a number of hours that a genset is online.

23. The method of claim 22, further comprising adding an additional genset to the initial bank of gensets when any genset in the initial bank of gensets has an unexpected reduction in power output.

\* \* \* \* \*